(12) United States Patent  (10) Patent No.: US 6,724,197 B2
Neven et al.  (45) Date of Patent: Apr. 20, 2004

(54) FILL-LEVEL DETECTOR

(75) Inventors: Joseph Neven, Mours (FR); Achim Bletz, Tournon sur Rhone (FR)

(73) Assignee: Krohne S.A., Romans-Cedex (FR)

( * ) Notice: Subject to any disclaimer, the term of this patent is extended or adjusted under 35 U.S.C. 154(b) by 0 days.

(21) Appl. No.: 10/212,409

(22) Filed: Aug. 5, 2002

(65) Prior Publication Data

US 2002/0186025 A1 Dec. 12, 2002

Related U.S. Application Data

(63) Continuation of application No. 09/691,086, filed on Oct. 18, 2000, now abandoned.

(30) Foreign Application Priority Data

Nov. 8, 1999 (DE) .......................... 199 53 709
Dec. 4, 1999 (DE) .......................... 199 58 584

(51) Int. Cl.$^7$ .............................................. G01R 27/04
(52) U.S. Cl. ..................................... 324/642; 324/644
(58) Field of Search ............................... 324/642, 643, 324/644, 533, 534, 535; 73/290 R

(56) References Cited

U.S. PATENT DOCUMENTS 5,986,449 A * 11/1999 Koski .................... 324/207.13
6,121,780 A * 9/2000 Cruickshank et al. ....... 324/643

* cited by examiner

Primary Examiner—Albert Decady
Assistant Examiner—James Kerveros
(74) Attorney, Agent, or Firm—Cesari and McKenna, LLP

(57) ABSTRACT

A fill-level detector operating by the radar principle gauges the fill-level of the lower of two substances layered one atop the other in a container. The detector incorporates first and second essentially straight, parallel electrical conductors having a signal generator and a transducer mounted to the upper ends of the conductors with the lower ends of the conductors protruding into the lower substance. The generator delivers a signal to the first conductor which signal is conducted into the lower substance with a portion of that signal being reflected at the interface of the two substances which signal portion is captured by the transducer. The detector is able to determine to fill level of the lower substance even when the upper substance displays a high dielectric constant.

5 Claims, 2 Drawing Sheets

FILL-LEVEL DETECTOR

CROSS-REFERENCE TO RELATED APPLICATIONS

The present application is a continuation of commonly assigned U.S. patent application Ser. No. 09/691,086, which was filed on Oct. 18, 2000 now abandoned.

BACKGROUND OF THE INVENTION

This invention relates to a fill-level detector employing the radar principle for gaging the level of the lower of two substances layered one atop the other within a container, said detector incorporating a first electrical conductor and a second electrical conductor, both extending parallel to each other in an essentially straight direction and protruding into the lower substance; a generator positioned outside the lower and the upper substance at the end of the first electrical conductor and, respectively, of the second electrical conductor for generating and transmitting an electromagnetic signal; and a transducer provided outside the first and the second substance at the end of the first electrical conductor and, respectively, of the second electrical conductor, for detecting a reflected portion of the electromagnetic signal.

Fill-level detectors of the type described above are currently being marketed by Krohne, S-A under such trade names as Reflex-Radar BM 100. The detection process of this type of fill-level gaging device, operating by the radar principle, is based on TDR (time domain reflectometry) measurements, a concept which has been used for instance in cable testing and which resembles that of radar equipment. For example, an extremely short electric pulse in one of these TDR fill-level detectors is guided along two essentially straight electrical conductors into a container holding a substance such as a liquid, a powder or a granular material whose fill level is to be determined. The short electric pulse transmitted into the container via the two electrical conductors is reflected by the surface of the substance and the reflected portion of the short electric pulse is captured by a transducer in the detector system. The reflected portion of the short electric pulse is a function of the relative dielectric constant or permitivity of the substance and increases with the augmentation of the latter. The runtime of the signal is proportional to the distance between the pulse generator, i.e. the transducer, and the surface of the substance in the container. Varying environmental conditions, whether a rising or falling atmospheric pressure or temperature, have no effect on the accuracy of the TDR fill-level detector. Moreover, the runtime of the signal is not influenced by the dielectric constant of the substance whose fill level is to be measured.

Apart from the detection of the fill level of one given substance in a container, however, there are applications which require the determination of the fill level of two substances layered one on top of the other. Such stratification can occur when the substances differ in terms of their intrinsic density. Performing such measurements with a conventional TDR fill-level detector mounted on top of the container is possible without difficulty only if the lower-density substance also has the lower dielectric value, meaning that the substance forming the upper layer has a lower dielectric coefficient than the substance underneath it.

As in the case described further above, the measurement can be obtained in a way similar to that for a regular fill-level determination in that a short electric pulse is generated and guided into the layered substances via the two electrical conductors protruding into them. In the process, a certain portion of the short electric pulse is reflected off the surface of the upper substance while the remaining portion of the short electric pulse penetrates into the upper layer and continues on within the same, with the propagation rate of that residual pulse traveling through the upper layer diminishing as a function of the dielectric coefficient of the upper substance. The portion of the short electric pulse continuing on through the upper layer is then partly reflected at the interface between the upper and the lower substance while a small percentage of the residual pulse penetrates into the lower substance. However, given the high dielectric coefficient of the lower substance, most of the residual pulse that passed through the upper layer is reflected at the interface between the upper and the lower layer, thus allowing that reflected residual pulse to be detected by the transducer. If the dielectric coefficient or constant of the upper substance is known, it is possible to determine the fill level of both the upper and, respectively, the lower substance.

However, in cases where the upper layer is the substance with the higher dielectric coefficient, the portion of the short electric pulse reflected off its surface is typically large enough that the portion of the short electric pulse effectively penetrating into the upper substance and potentially reflected at the interface between the upper and the lower layer is too insignificant for a reliable TDR measurement. Where that is the case, any measurement employing a conventional TDR fill-level detector is possible only if the TDR fill-level detector is mounted not on top of the container but at its bottom. Only then would the short electric pulse "see" the substance with the lower dielectric coefficient first, i.e. before it impinges on the substance having the higher dielectric coefficient at whose interface with the lower dielectric coefficient the major portion of the short electric pulse would be reflected. However, mounting a TDR fill-level detector underneath the container is not only structurally complex, if at all possible, but it can also entail serious safety hazards.

SUMMARY OF THE INVENTION

It is therefore the objective of this invention to provide a fill-level detector which can be mounted on top of a container, which operates by the radar principle and which permits the gaging of the fill level of the lower of two substances layered in the container one atop the other, even when the upper substance has a lower density but a higher dielectric coefficient than the lower substance.

The fill-level detector according to this invention which solves the problem referred to and described above, is characterized in that the electromagnetic signal can be coupled into the lower substance at the end of the first electrical conductor positioned in the lower layer and that a portion of the electromagnetic signal reflected at the interface between the upper and the lower substance can be detected by the transducer. For two layered substances, the invention thus provides for the electromagnetic signal to be coupled directly into the lower substance and for the portion of the electromagnetic signal that is reflected at the interface between the lower and the upper substance to be detectable, so that, when the dielectric coefficient of the lower substance is known, the fill level of the latter can be determined. The strong reflection of the electromagnetic signal at the point of transition to the upper substance with the high dielectric coefficient is thus utilized for the measurement and the electromagnetic signal, unlike that in conventional TDR fill-level detectors, is not attenuated before it reaches the lower substance.

In a preferred, embodiment according to this invention, the electromagnetic signal emanating from the generator can be coupled into the first electrical conductor and transmitted through that conductor to the end of the latter that is positioned in the lower substance without the signal making contact with the upper and the lower substance. Since in the first electrical conductor the electromagnetic signal is propagated at the speed of light, its runtime in the first electrical conductor can be easily determined so that, when the dielectric coefficient of the lower substance is known, the fill level of the latter can be easily calculated based on the total runtime of the electromagnetic signal and its reflected portion. The TDR fill-level detector according to this invention is preferably further enhanced in that the electromagnetic signal and its portion that is reflected at the interface between the lower and the upper substance can be guided in the lower substance between the two electrical conductors.

For simplifying the coupling of the electromagnetic signal into the first electrical conductor, that first electrical conductor is preferably hollow and ideally in the form of a rigid tube. The fill-level detector according to this invention can preferably be further enhanced in that the first conductor contains an inner conductor which is electrically insulated from the inner surface of the first electrical conductor. It may suffice to provide such insulation by spacing the inner conductor in the first electrical conductor from the inner surface of the latter. Preferably, however, the inner conductor inside the first electrical conductor is provided with an insulating jacket, preferably of PTFE. With particular preference, the inner conductor within the first electrical conductor is so designed that uniform impedance prevails over essentially the entire length of the inner conductor and the first electrical conductor.

In a preferred, embodiment of the TDR fill-level detector according to this invention, the electromagnetic signal can be coupled into the inner conductor at the end of the first electrical conductor situated outside the lower and the upper substance, it can then be decoupled from the inner conductor at the end of the first electrical conductor positioned in the lower substance and transferred into the second electrical conductor, following which it can be guided in the lower substance between the first electrical conductor and the second electrical conductor. At the end of the first electrical conductor positioned in the lower layer, the inner conductor is preferably connected in electrically conductive fashion to the second electrical conductor.

Preferably, for increased structural strength of the TDR fill-level detector according to this invention, at least one horizontal brace is provided between the first electrical conductor and the second electrical conductor. Of course, any such cross brace will normally have to be electrically insulating. However, in the preferred, embodiment of the TDR fill-level detector according to this invention, the brace is provided at the end of the first or, respectively, second electrical conductor positioned in the lower substance and is then utilized as an electrical connection, insulated from the first electrical conductor, between the inner conductor and the second electrical conductor.

Finally, in a preferred embodiment of the TDR fill-level detector according to this invention, the end of the first electrical conductor situated in the lower substance is provided with a seal preferably consisting of PTFE and/or Viton.

BRIEF DESCRIPTION OF THE DRAWINGS

There are numerous ways in which the design of the TDR fill-level detector according to this invention can be configured and further enhanced. In this context, reference is made to the dependent claims and to the detailed description of a preferred embodiment of this invention in conjunction with the drawings, in which:

DETAILED DESCRIPTION OF AN ILLUSTRATIVE EMBODIMENT

Figure 1:
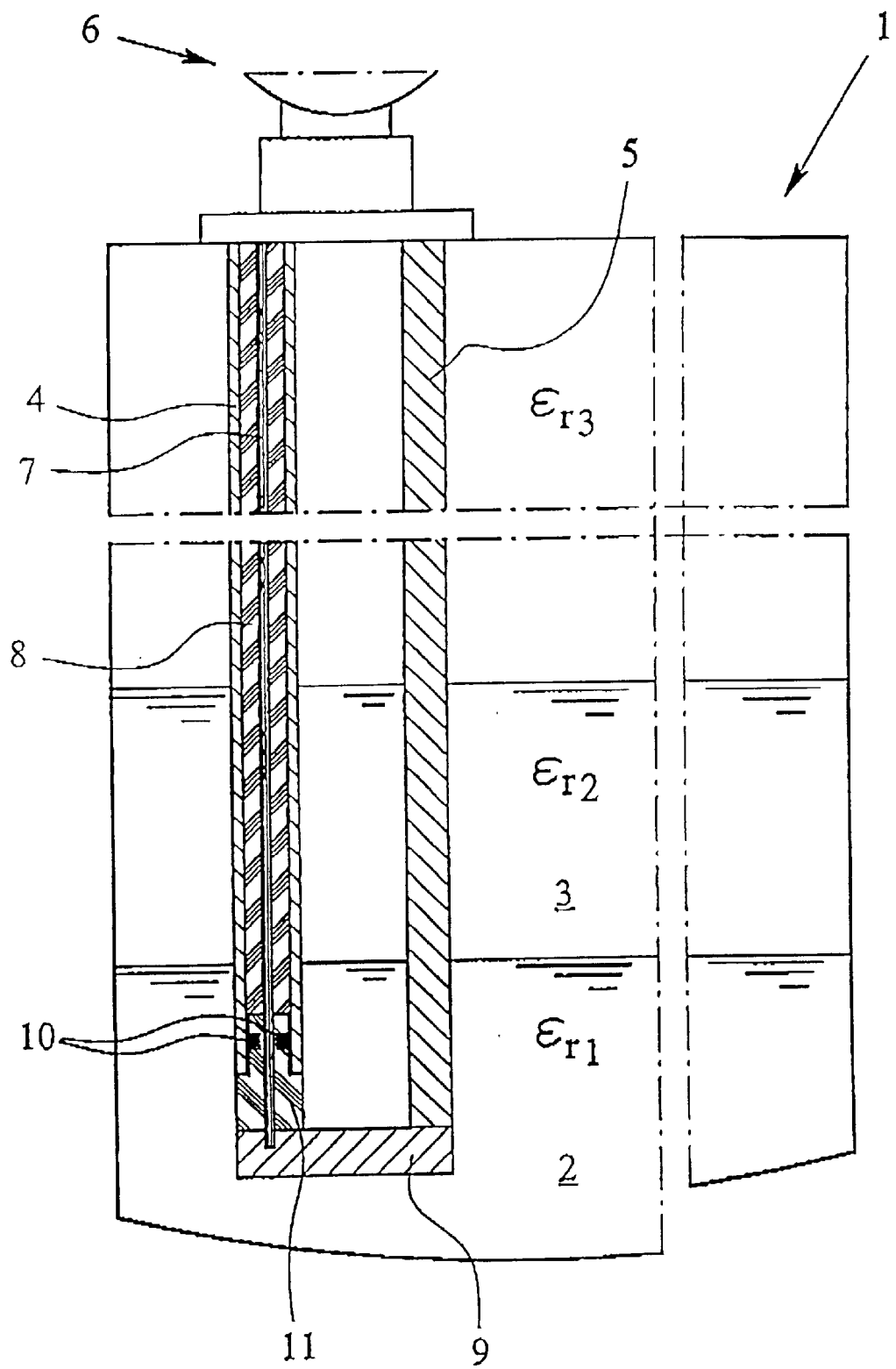
FIG. 1 is a schematic illustration of a TDR fill-level detector, mounted on top of a container, according to a preferred embodiment of this invention.

FIG. 1 is a schematic, cross-sectional view of a TDR fill-level detector according to a preferred embodiment of this invention, mounted on top of a container 1 filled with a substance 2 over which a substance 3 is layered. The dielectric coefficient $\epsilon_{r1}$ of the lower substance 2 is less than the dielectric coefficient $\epsilon_{r2}$ of the upper substance. In typical applications of the fill-level detector according to this invention, $\epsilon_{r2}$ has a value of 20 and higher. Above the upper substance 3 there is a gas such as air with a dielectric coefficient of $\epsilon_{r3}$. The TDR fill-level detector according to the preferred embodiment of this invention incorporates a first electrical conductor 4 and a second electrical conductor 5. Positioned at their ends outside the substance 2 is a partly outlined-detector enclosure 6 of the TDR fill-level detector. The detector enclosure 6 houses a generator, not shown, serving to generate and transmit an electromagnetic signal which, in the preferred embodiment here described, is a short electric pulse used for the TDR fill-level gaging, as well as a transducer, not shown, for capturing a reflected portion of the short electric pulse.

Inside the first electrical conductor 4 is an inner conductor 7 which is insulated from the inner wall of the first electrical conductor 4 by means of a PTFE jacket 8. By way of a cross brace 9, the inner conductor 7 is connected in electrically conductive fashion to the end, positioned in the substance 2, of the second electrical conductor 5. A spacer 1, provided with a seal 10 preferably of PTFE or Viton plastic, serves the dual purpose of sealing the inside of the first electrical conductor 4 and insulating the first electrical conductor 4 from the inner conductor 7 and the second electrical conductor 5. The first electrical conductor 4, the second electrical conductor 5 and the cross brace 9 consist of high-grade stainless steel, i.e. the first electrical conductor 4 is a rigid, metallic, tubular element. This allows a short electric pulse produced by the generator to be coupled into the inner conductor 7 inside the first electrical conductor 4 and to travel through the latter all the way to its end situated in the substance 2, without the short electric pulse making contact with the substance 2 or substance 3. Its rate of propagation thus corresponds to the speed of light. At the end of the first electrical conductor 4 in the substance 2, the short electric pulse is decoupled from the inner conductor 7 and transferred via the cross brace 9 to the second electrical conductor 5.

At the cross brace 9, exiting from the inner conductors, the short electric pulse which up to this point has traveled in a downward direction, is practically reflected upwards, reversing its path. The cross brace essentially serves as a "mirror" which reverses the direction of travel of the short electric pulse. The short electric pulse then continues upward within the lower substance 2 between the second electrical conductor 5 and the first electrical conductor 4, now serving as a reference conductor, its rate of propagation diminished as a function of the dielectric coefficient $\epsilon_{r1}$.

Figure 2:
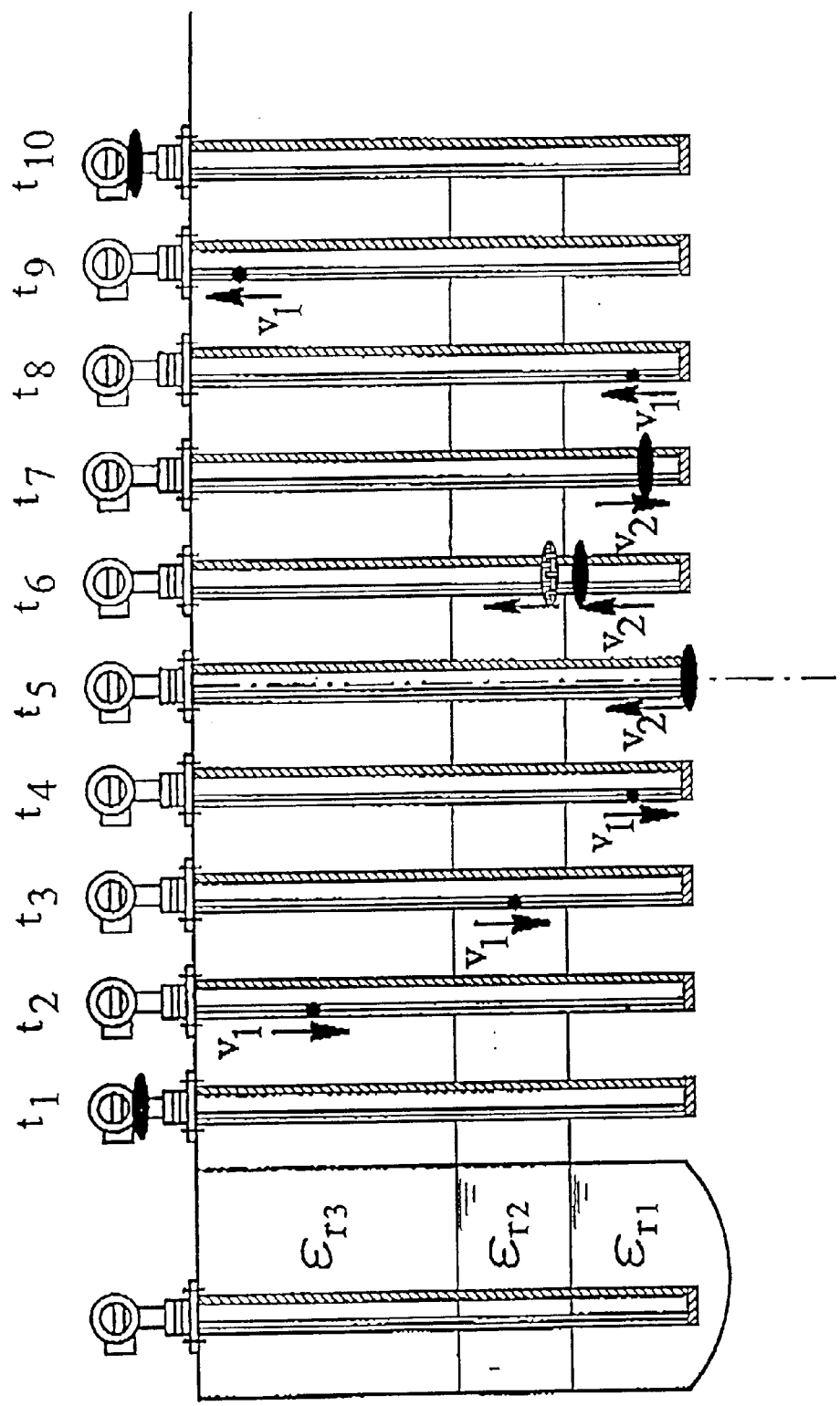
FIG. 2 shows schematically the flow of the measuring process employing a TDR fill-level detector according to the preferred embodiment of this invention.

The actual flow of the TDR fill-level measuring process employing a TDR fill-level detector according to a preferred embodiment of this invention is schematically shown in FIG. 2 in time-sequential sub-steps $t_1$ to $t_{10}$. At time $t_1$, the generator housed in the detector enclosure 6 produces a short electric pulse. Without making electrical contact with the first electrical conductor 4, the short electric pulse is coupled into the inner conductor 7 which in insulated fashion extends within the first electrical conductor 4. In essence, the core conductor of the coaxial cable which serves to forward the short electric pulse emanating from the pulse generator is thus directly connected to the inner conductor 7. The inner conductor 7, jointly with the first electrical conductor 4, essentially constitutes an extension of the coaxial cable carrying the short electric pulse from the generator. At the speed of light $v_1$, the short electric pulse travels inside the first electrical conductor 4 to the end of the latter, situated in the lower substance. As is evident from the time indications $t_2$, $t_3$ and $t_4$, the rate of propagation of the short electric pulse within the first electrical conductor 4 remains at the speed of light $v_1$ regardless of where the short electric pulse happens to be, i.e. regardless of which substance surrounds the first electrical conductor 4 at any one time, since the short electric pulse, while in the first electrical conductor 4, does not make contact with the externally surrounding substances. At time $t_5$ the short electric pulse reaches the end of the first electrical conductor 4 situated in the lower substance 2 at which point it is decoupled and transferred to the second electrical conductor 5 which is connected in electrically conductive fashion to the inner conductor 7 by way of the cross brace 9. The short electric pulse is then further propagated at the reduced rate $v_2$ corresponding to the dielectric coefficient $\epsilon_{r1}$ of the lower substance 2 and travels upward between the first electrical conductor 4 and the second electrical conductor 5. At time $t_6$, the short electric pulse reaches the interface between the lower substance 2 and the upper layer of substance 3. Due to the high dielectric constant $\epsilon_{r2}$ of the substance 3, typically more than 20, only a small portion of the short electric pulse penetrates into the substance 3 while the major portion of the short electric pulse is reflected at the interface between the substance 2 and the substance 3, resuming its downward path at the rate $v_2$ corresponding to the dielectric constant $\epsilon_{r1}$ of the substance 2. At the end of the first electrical conductor 4, situated in the substance 2, the reflected portion of the short electric pulse is then coupled back into the inner conductor 7 within the first electrical conductor 4 where it travels along the inner conductor 7, at the speed of light $v_1$, over the entire distance from the end of the first electrical conductor 4 in the substance 2 to the transducer housed in the detector enclosure 6. Finally, at time $t_{10}$, the reflected portion of the electric pulse is captured by the transducer.

Since the length of the first electrical conductor, meaning the distance from the generator or transducer to the end of the first electrical conductor 4 in the substance 2, the dielectric constant $\epsilon_{r1}$ of the lower substance 2 and the speed of light $v_1$ are known factors, the total runtime of the short electric pulse and that of its reflected portion from the generator to the interface between the lower substance 2 and the upper substance 3 and back to the transducer will be indicative of the fill level of the second substance 2.

If the dielectric constant $\epsilon_{r1}$ of the substance 2 is not known from the start, it can be determined by means of a conventional TDR fill-level gaging procedure, provided the substance 3 is not yet layered on top of the substance 2, or by another conventional process such as a capacitive measurement, or it can be determined by means of the process according to this invention if the fill-level of the lower substance 2 is known. Hence, the only calibration parameters required for installing the TDR fill-level detector according to this invention are the dielectric constant of the lower substance 2 and the length of the first electrical conductor 4.

The preferred embodiment of this invention, described above, pertains to a TDR fill-level detector, i.e. a TDR fill-level gaging procedure employing short electric pulses as the electromagnetic signal. Of course, this invention is equally suitable for use with a fill-level detector or fill-level gaging procedure employing as the electromagnetic signal continuous electromagnetic waves, thus including for instance an FM-CW process.

What is claimed is:

1. A fill-level detector, operating by the radar principle for gauging the fill level of the lower of two substances layered one atop the other in a container so that the substances have a common interface, said detector comprising first and second essentially straight, parallel electrical conductors, said conductors having corresponding upper ends extending outside said substances and corresponding lower ends protruding into the lower substance, said first conductor including coaxial inner and outer conductive elements electrically insulated from one another along their common lengths;

a signal generator mounted to the upper ends of said conductors which delivers an electromagnetic signal to an upper end of the inner conductive element;

connector means at the lower end of the first conductor that electrically connect the inner conductive element to the second conductor for decoupling said signal from said inner conductive element and transferring said signal within the lower substance to the second conductor whereby said signal is guided upward within the lower substance between said first and second conductors with a portion of said signal being reflected at said interface, and a transducer mounted to the upper ends of the first and second conductors which captures said reflected portion of said signal.

2. The fill-level detector defined in claim 1, wherein the inner conductive element is surrounded by an electrically insulating plastic jacket.

3. The fill-level detector defined in claim 1 or 2 wherein a plastic seal is present at the lower end of the first conductor.

4. The fill-level detector defined in claim 1 or 2 wherein the connector means include an uninsulated segment of the inner conductive element which extends beyond the outer conductive element.

5. A fill-level detector operating by the radar principle for gauging the fill level of the lower of two substances layered one atop the other in a container so that the substances have a common interface, said detector comprising first and second essentially straight, parallel electrical conductors, said conductors having corresponding upper ends extending outside said substances and corresponding lower ends protruding into the lower substance, said first conductor including coaxial inner and outer conductive elements electrically insulated from one another along their common lengths;

a signal generator mounted to the upper ends of said conductors which delivers an electromagnetic signal to an upper end of the inner conductive element;

a cross brace at the lower end of the first conductor, the cross brace electrically connecting the inner conductive element and transferring said signal within the lower substance to the second conductor whereby said signal is guided upward within the lower substance between said first and second conductors with a portion of said signal being reflected at said interface, and a transducer mounted to the upper ends of the first and second conductors which captures said reflected portion of said signal.

* * * * *